March 29, 1966 W. L. CARLSON, JR 3,243,555
TEMPERATURE RESPONSIVE CONTROL APPARATUS
Filed March 23, 1964
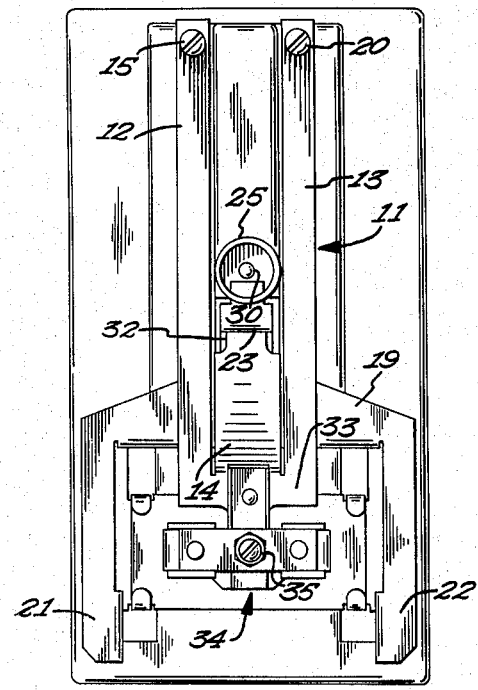
FIG 1
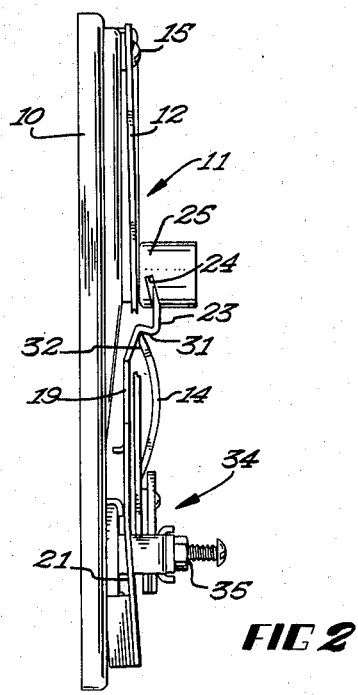
FIG 2
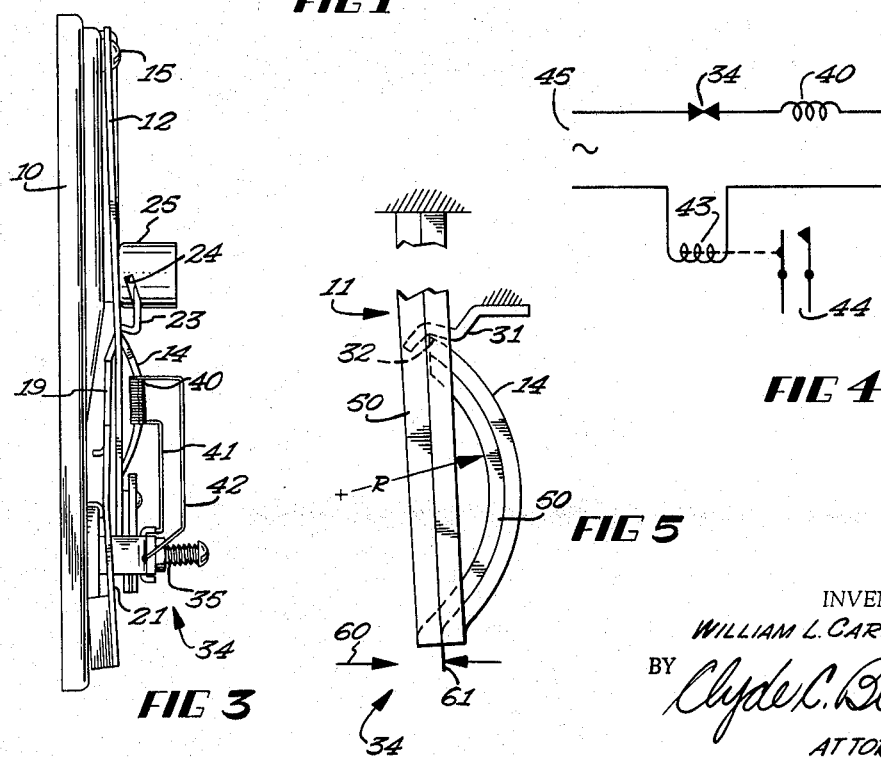
INVENTOR.
WILLIAM L. CARLSON JR.
BY
ATTORNEY

United States Patent Office 3,243,555
Patented Mar. 29, 1966

3,243,555
TEMPERATURE RESPONSIVE CONTROL
APPARATUS
William L. Carlson, Jr., Bloomington, Minn., assignor to
Honeywell Inc., a corporation of Delaware
Filed Mar. 23, 1964, Ser. No. 353,819
5 Claims. (Cl. 200—122)

The present invention is concerned with an improved temperature responsive control or thermostat; in particular, the improvement is in the use of an E-shaped bimetal element using the center leg to provide a pivot to provide an overcenter type switch operation such that the affect of the temperature on the center leg whether produced naturally or artificially can result in an improved operation.

Thermostats making use of a bimetal which is attached to a base at one end and connected at the other end to a pivoting member so the bimetal is under tension and an overcenter operation is provided to operate a switch are broadly old. In such thermostats, the force on the overcenter pivoting member or knife edge is usually the force which limits the magnitude of other forces in the thermostat. In order to have a reasonable contact force to maintain good electrical connection between the contacts when the thermostat snaps in one direction, the structure of the thermostat heretofore necessitated a high pivot point force. At the same time, a high pivot point force tends to break down the pivot member or knife edge resulting in poor operation of the thermostat. Thermostats of this type generally are designed with a force on the knife edge below some predetermined maximum value, and as a result, the other forces in the thermostat which are desired to be as high as possible such as the contact force will be lowered.

In the present invention, the knife edge or pivoting member of the thermostat which provides the overcenter type of operation is temperature responsive and can be the center leg of an E-shaped bimetal element. The center member is formed in an arcuate manner so the free end or the thick portion of the E-shaped element can move in an overcenter manner from one side or the other depending upon the temperature of the bimetal. As the bimetal drops in temperature, the center leg warps to change its effective length to reduce the force required to snap the thermostat mechanism over-center. In this manner, the knife edge force is lowered and the contact force is maintained high.

Another feature of the present invention is to make use of the center leg to adjust the control point of the thermostat. An electric heater is mounted on the center leg to artificially heat the center leg and thus change the control point of the thermostat. When the heater is energized by the thermostat switch operation to energize the heater proportional to the on-time of the conditioning load, the control point of the thermostat can be offset to overcome a "droop" in the thermostat.

An object of the present invention is to provide a thermostat with a temperature responsive element having three legs and an overcenter switch operation wherein a pivotal member of the overcenter mechanism changes in effective length with temperature changes.

Another object of the present invention is to provide a thermostat with a temperature responsive element having a temperature responsive pivoting member which can be artificially heated to offset the control point of the thermostat.

These and other objects will become apparent upon the study of the following specification and drawing of which:

FIGURE 1 is a front view of the thermostat showing the E-shaped bimetal for operating the switch in an overcenter snap acting manner.

FIGURE 2 is a side view looking from the left of the thermostat shown in FIGURE 1.

FIGURE 3 is a second modification of the thermostat shown in FIGURES 1 and 2 with a heater mounted on the center leg of the bimetal element.

FIGURE 4 is a typical schematic circuit for the energization of the heater of the thermostat shown in FIGURE 3.

FIGURE 5 is a schematic representation of the thermostat element shown in FIGURES 1, 2 and 3 which is drawn in an elaborated manner for explaining the operation.

Referring to FIGURE 1, a temperature responsive switching device or thermostat has a base 10. A temperature responsive element or E-shaped bimetal 11 has two long legs 12 and 13 and a center leg 14 which are made from a single stamping of bimetal material. Long legs 12 and 13 are attached at the free extremities to the base 10 by screws 15 and 20. An adjustable support member 19 of an inverted Y-shape has two lower portions or legs 21 and 22 connected to base 10. An upper projecting portion 23 of member 19 is fitted into a notch or cam 24 of an adjustable knob 25 mounted on a shaft 30 attached perpendicular to the space in between legs 12 and 13 of the bimetal element. When knob 25 is rotated, projecting portion 23 moves to the right or left as shown in FIGURE 2. Member 23 has a bent portion 31 which provides a surface to be engaged by a pivoting member or knife edge 32 of the free extremity of short leg 14.

Short leg 14 is bent in an arcuate manner to curve in a counterclockwise direction as shown in FIGURE 2 so knife edge 32 may be in or adjacent the plane of the longer legs 12 and 13. When the mechanism is assembled, the element 11 is maintained so that legs 12 and 13 are in tension and the short leg 14 is in compression. The force is attained by providing that the distance between screws 15 and 20 or the fixed end of legs 12 and 13 of bimetal element 11 and the knife edge support 32 is greater than the distance between screws 15 and 20 and knife edge 32 when not assembled. With such a design, an overcenter type of operation is provided so the element 11 is unstable in the center position with the knife edge in alignment with the plane of the longer legs 12 and 13 of the bimetal. Element 11 tends to move to a right or a left position from a center position. Element 11 is shown to the right in FIGURE 2.

Attached to a lower solid portion 33 of E shaped bimetal element 11 is a switch assembly 34 which comprises a bar member for movement against or away from fixed electrical contacts depending upon the motion of the lower portion 33 of the bimetal element. The details of the switch are not shown as such a switch design is quite conventional as shown in the Rollin A. Alcott et al. application, Serial No. 102,468, filed April 12, 1961, now patent 3,138,685 entitled Control Apparatus. By means of a screw 35 the adjustment of the switch contacts and movement of the lower portion 34 of the bimetal can be adjusted to change the operating differential of the thermostat.

Another embodiment of the present invention is shown in FIGURE 3 wherein a similar switch operator making use of an E-shaped bimetal element as shown in FIGURES 1 and 2 is shown. An electric heater 40 which is connected by leads 41 and 42 to be energized when the thermostat switch closes is wrapped around short leg 14 of the E-shaped bimetal. The typical circuit for energizing heater 40 is shown in FIGURE 4 wherein the energization of heater 40 is accomplished when the thermostat switch 34 closes to connect the source of power to a control relay 43 which has contacts for controlling a conventional conditioning apparatus connected to a circuit 44. Each time the thermostat connects source of power 45 to energize the relay 43, heater 40 is energized. While the circuit of FIGURE 4 is one type of circuit for energization of heater 40, the manner of energization of the heater using other circuits may be obvious to one skilled in the art.

In FIGURE 5, the bimetal element is shown with the center or short leg 14 bent in an arcuate manner. The bimetal has the high expansion metal 50 on the left side on both the long legs and the short legs. The knife edge at the free end of leg 14 engages the support 31 which is shown as a fixed support in FIGURE 5 as is the case when no change in the control point is made by the adjustment of the knob 25 in FIGURES 1, 2 and 3.

*Operation*

Referring to FIGURES 1 and 2, the thermostat is shown in heated position wherein the lower portion 34 of the E-shaped bimetal element is outward in FIGURE 1 and to the right in FIGURE 2. By the adjustment of knob 25, the position of member 31 and thus the pivot point for knife edge 32 can be adjusted to change the control point of the thermostat. As the bimetal of long legs 12 and 13 drops in temperature due to a reduction in the temperature of the air surrounding the element, the bimetal element will bend in a clockwise direction as shown in FIGURE 2 since the high expansion side is on the left side of the bimetal. The force developed by the bimetal must overcome a maximum force needed to drive the bimetal overcenter. This force is developed when the bimetal moves to the left and the pivot point or position of knife edge 32 reaches the center of the plane of the bimetal in which the effective length of the center leg 14 is sufficient to increase the tension force on the long legs of the bimetal. Once the force is overcome, lower portion 33 of the bimetal will move to the left to provide a snap action operation for switch 34.

In thermostats and switch operators of the overcenter type the force on the knife edge is of concern. As the bimetal moves toward the center position the force increases until a maximum force on knife edge 32 exists. Once the switch snaps overcenter, the force developed by the bimetal is applied to the switch or contacts to establish a contact force. In switch designs, the contact force must be high to maintain good electrical contact; however, since the contact force is a function of the knife edge force some compromise has been previously used. The contact force is maintained low so the knife edge force is within a safe maximum value.

With the use of the center leg 14 made from the same bimetal element, a decrease in the temperature of the center leg 14 results in a smaller radius of curvature of the center leg 14. Referring to FIGURE 5, the radius R of the center leg 14 is shown. As the temperature of the bimetal decreases and the high expansion sides 50 becomes shorter, the radius R will become smaller causing the effective length of member 14 to become less. Upon the bimetal element moving to the left due to the decrease in length of the high expansion side 50 of the bimetal, the force needed to go through the overcenter operation will be reduced. In this manner, the overcenter action will come about by less force being developed by long legs 12 and 13 of the bimetal. When the lower portion 33 snaps to the left past the center position, a switch contact 60 will be engaged by a movable member 61 as shown in FIGURE 5. Since the amount of force to drive the thermostat overcenter is lessened, the amount of force available to hold member 61 against fixed contact 60 is greater for a predetermined maximum force desired at knife edge 32.

When the bimetal is heated, the movement is to the right. The force on knife edge 32 will not exceed a maximum value which substantially the same as the maximum force on the cooling operation.

In such a thermostat design, the force needed to drive the mechanism overcenter is accomplished by a predetermined amount of work from the bimetal as the bimetal changes in temperature. When the overcenter force is of a predetermined value, the amount of temperature change to move overcenter has a direct relationship to the amount of force resulting on the contacts once the overcenter action is accomplished. With the present invention, the force at the knife edge is reduced and yet once the thermostat moves past the center operation to engage the switch contacts, a high contact pressure is obtained.

Directly related to the force required to accomplish the overcenter operation is the thermostat operating temperature differential. If a large amount of force is needed to drive the mechanism overcenter, the temperature change to accomplish such a force from the bimetal is large. By means of the center leg 14, the required force to accomplish the overcenter operation is reduced and the temperature change to produce a complete operation from the right side to the left side and back is maintained at a minimum.

In the embodiment of FIGURE 3, a similar bimetal element is used with a heater 40 to artificially heat the center leg 14 shown in FIGURE 5. Since the position of the knife edge 32 determines the control point of the thermostat or the control at which the thermostat will snap overcenter, an adjustment of the position of the knife edge by moving knob 25 as shown in FIGURES 1, 2 and 3 will change the control point of the thermostat. During normal operation of the thermostat as the load increases, a conventional "droop" exists in the thermostat operation. In other words, the control temperature will drop as the load increases requiring a greater amount of one-time of the conditioning apparatus. In order to reduce the amount of "droop" many means have been devised to offset the control point of the thermostat.

By means of heater 40, the center leg 14 is heated to bend the leg and effectively move the position of knife edge 32 which changes the control point of the thermostat. By energizing heater 40 in response to the need for control of the conditioning apparatus, the amount of energization can be increased as the amount of operation of the conditioning apparatus is increased. As switch 34 of the thermostat is closed a greater proportion of the time, center leg 14 is heated to a higher average temperature to offset the control point of the thermostat and overcome the drooping condition.

While the present invention is described in one particular manner, the intent is to limit the scope of the present invention only by the appended claims in which

I claim:

1. In a thermostat, a base, an E-shaped bimetal element, said element having a main portion and two long legs and a center short leg extending from said main portion, said center leg having a knife edge at its extremity, connection means connecting free extremities of said long legs to said base, an adjustable support attached to said base, means pivotally supporting said knife edge on said support to maintain said long legs of the bimetal in tension whereby said bimetal can snap in an overcenter action manner to move said main portion from one plane to another on each side of a center position when said bimetal changes temperature, a switch, and connection means connecting said switch to said main portion of said bimetal whereby said switch is operated when said bimetal moves from said one plane to said another plane upon a temperature change.

2. In a thermostat, an E-shaped bimetal element with two long legs and a center short leg, said bimetal having a high expansion side and a low expansion side, a base, means connecting a free extremity of said two long legs to said base, said short leg being formed in an arc having a predetermined radius with said high expansion side on the inside surface and a free extremity being adjacent said long legs, said free extremity of said short leg having a knife edge, a support attached to said base to be engaged by said knife edge to place said long legs in tension and said short leg in compression whereby said bimetal is unstable in a center position to move to a left or right side of said center position upon a change in temperature, switch means connected to said bimetal to be operated when said bimetal moves from said center position, a resistance heater attached to said short leg, a source of power, and circuit means including said switch means for connecting said heater to said source and adapted to connect said switch means to control a temperature conditioning apparatus, said bimetal being to said right side when the temperature is above a predetermined value and upon the temperature dropping said bimetal moves to the left, said radius of said short leg increasing upon the temperature increasing to change said predetermined value.

3. In a thermostat, a bimetal element having a long leg and a short leg, a base, means connecting a free end of said long leg to said base, said short leg being bent in an arcuate shape to have a free end adjacent a plane of said long leg, pivotal means connecting a free end of said short leg to said base to place one of said legs in compression whereby said bimetal element is unstable in a center position and snaps to a left side at a predetermined temperature of said element, switch means connected to said base and said element to be operated when said element moves to said left side, said pivotal means establishing a control temperature of said element, electrical heater means mounted in thermal relation to said short leg for heating said short leg to change said arcuate shape whereby said control temperature is changed, and circuit means including said switch means adapted to connect said heater to a source of power whereby said short leg is heated to change said predetermined temperature and thereby offset said control temperature of the thermostat a predetermined amount.

4. In a thermostat, a temperature responsive means, a base, temperature responsive pivotal means connecting said responsive means to said base, switch means connected to said responsive means to be operated when said responsive means moves upon reaching a predetermined temperature, said pivotal means establishing a control temperature of said responsive means, heater means adjacent said pivotal means for changing said control temperature, and circuit means including said switch means adapted to connect said heater means to a source of power whereby said pivotal means is heated by an amount depending upon operation of said switch means to change said predetermined temperature and thereby offsetting said control temperature of the thermostat.

5. In a thermostat, a bimetal element with two long legs and a center short leg, said bimetal having a high expansion side and a low expansion side, a base, means connecting a free extremity of said two long legs to said base, said short leg being formed in an arc having a predetermined radius with said high expansion side on the inside surface and a free extremity being adjacent said long legs, said free extremity of said short leg having a knife edge, a support attached to said base to be engaged by said knife edge to place said long legs in tension and said short leg in compression whereby said bimetal is unstable in a center position to move to a left or right side of said center position upon a change in temperature, and switch means connected to said bimetal to be operated when said bimetal moves from said center position, said bimetal being to said right side when the temperature is above a predetermined value and upon the temperature dropping a predetermined amount said bimetal moves to said left side, said bimetal moving back to said right side when said temperature increases by said predetermined amount, said temperature change being the thermostat differential, said radius of said short leg becoming smaller upon the temperature dropping to reduce the effective length of said short leg and thus reducing said tension and compression to maintain a force between said knife edge and said support below a predetermined minimum to maintain the thermostat differential at a minimum.

References Cited by the Examiner
UNITED STATES PATENTS 2,255,169 9/1941 Ireland ---------- 200—122 X
2,495,349 1/1950 Rohr -------------- 200—67

FOREIGN PATENTS 1,045,472 11/1953 France.
632,862 12/1949 Great Britain.

B. DOBECK, *Primary Examiner.*

BERNARD A. GILHEANY, *Examiner.*

L. A. WRIGHT, T. D. MACBLAIN, *Assistant Examiners.*